United States Patent
Desloge

(10) Patent No.: US 6,806,442 B2
(45) Date of Patent: Oct. 19, 2004

(54) METHOD AND APPARATUS FOR SPLICING TUBULAR HEATER SECTIONS

(75) Inventor: George B. Desloge, Town & Country, MO (US)

(73) Assignee: Watlow Electric Manufacturing Company, St. Louis, MO (US)

(*) Notice: Subject to any disclaimer, the term of this patent is extended or adjusted under 35 U.S.C. 154(b) by 0 days.

(21) Appl. No.: 10/136,085

(22) Filed: May 1, 2002

(65) Prior Publication Data

US 2003/0205560 A1 Nov. 6, 2003

(51) Int. Cl.[7] .............................. B23K 9/02; B23K 9/12
(52) U.S. Cl. .................. 219/125.11; 219/61; 219/60 A
(58) Field of Search .............................. 219/61, 60 A, 219/60 R, 72, 125.11

(56) References Cited

U.S. PATENT DOCUMENTS

| | | | |
|---|---|---|---|
| 1,523,434 A | | 1/1925 | Lightfoot et al. |
| 2,375,058 A | | 5/1945 | Wiegand |
| 2,577,080 A | | 12/1951 | Glenn |
| 2,854,556 A | | 9/1958 | McOrlly |
| 3,069,529 A | * | 12/1962 | Gotch ....................... 219/60 A |
| 3,194,936 A | * | 7/1965 | Rohrberg et al. ......... 219/60 A |
| 3,324,275 A | * | 6/1967 | Peignen .................... 219/60 R |
| 3,395,262 A | * | 7/1968 | Kazlauskas ............... 219/60 A |
| 3,534,199 A | * | 10/1970 | Downey et al. .......... 219/60 R |
| 3,621,177 A | * | 11/1971 | McPherson et al. .......... 219/51 |
| 3,688,072 A | * | 8/1972 | Witt .......................... 219/60 A |
| 3,780,254 A | * | 12/1973 | Rygiol ......................... 219/61 |
| 3,805,011 A | * | 4/1974 | Knaefel et al. ........... 219/60 A |
| 3,859,721 A | | 1/1975 | Cunningham et al. |
| 4,033,028 A | | 7/1977 | Howie et al. |
| 4,314,401 A | | 2/1982 | Saku |
| 4,379,215 A | * | 4/1983 | Rohrberg ................... 219/60 A |
| 5,679,271 A | * | 10/1997 | Guerrina ................... 219/60 A |
| 5,824,983 A | * | 10/1998 | Huddleston, Jr. ............ 219/61 |
| 5,864,941 A | | 2/1999 | Baichoo et al. |

OTHER PUBLICATIONS

Entegris, Inc.–Cynergy Weld–in–Place Equipment–2000.
Swagelok Company Series 10 Weld Head–Oct. 2001.

* cited by examiner

Primary Examiner—Kiley Stoner
Assistant Examiner—Kevin P. Kerns
(74) Attorney, Agent, or Firm—Ari M. Bai; Greensfelder, Hemker & Gale, P.C.

(57) ABSTRACT

An apparatus for splicing a heatable section of a tubular heater to a cold section, the heatable section includes an outer sheath, which has a heating element therein. The cold section includes an outer sheath which has a cold pin therein. The apparatus comprises an enclosure defining a chamber which further defines opposed openings in communication with the chamber. A welding tip extends into the chamber and is capable of melting the cold pin and welding the ends of the heatable and cold sections together.

31 Claims, 10 Drawing Sheets

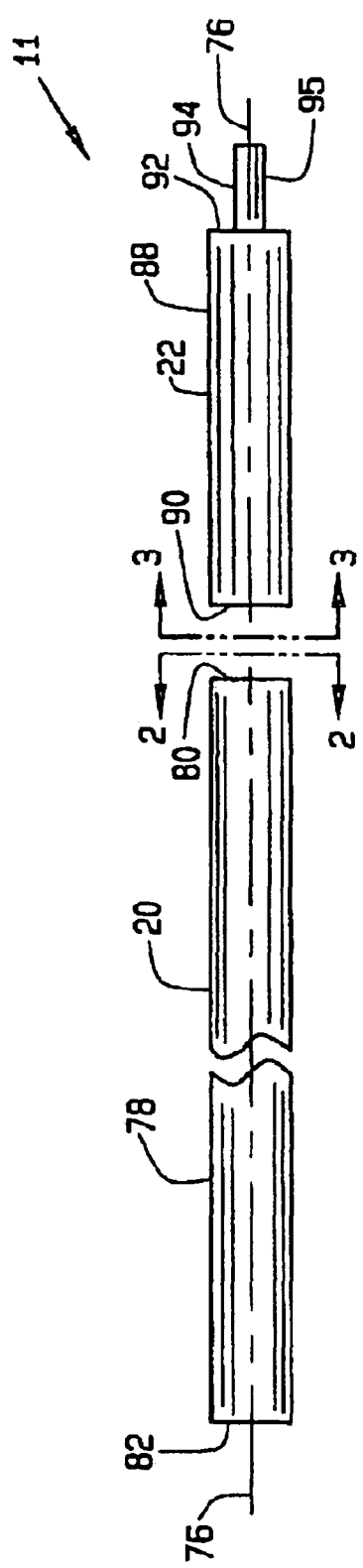

METHOD AND APPARATUS FOR SPLICING TUBULAR HEATER SECTIONS

BACKGROUND OF THE INVENTION

1. Field of the Invention

The present invention relates to splicing the two different sections of a tubular heater. More specifically, the present invention relates to a method and apparatus for splicing together one end of a cold pin section with the end of a section having a heatable coil without additional parts or special preparation of the heater section ends.

2. Prior Art

Typically, heaters are comprised of an inner metal resistive coil, referred to as a heating element, surrounded by an insulating filler that is, in turn, surrounded by an outer metal sheath. Such heaters are well known in the art. These heaters are constructed with a sheath made from a round metal tube. These are sometimes referred to as "tubular heaters," even if the sheath is rolled or flattened after manufacture.

In many applications, it is necessary to provide a tubular heater that has at least one heatable ("heatable") section and at least one unheated ("cold") section. The heatable section generally includes a heating element coil that is helically-wound of electrically resistive material, surrounded by an insulating filler material, such as magnesium oxide, which is then surrounded by an outer metal sheath. The cold section generally has a power pin (also known as a "cold pin"). The cold section is surrounded by an insulating filler material that is, in turn, surrounded by a metal sheath similar to the sheath used in the heatable section. During manufacturing, the cold pin is coupled with the heating element coil of the heatable section. Voltage is then applied to the cold pin, which conducts the current to the heating element coil to generate heat. In other applications it may be necessary to manufacture tubular heaters with varying watt density along the length of the heater. Many variations in heater assembly necessitate the custom manufacture and splicing of these kind of tubular heaters.

One innovative way of splicing the heatable and cold sections is disclosed in U.S. Pat. No. 5,864,941 ("the '941 patent") issued to Baichoo et al. assigned to Watlow Electric Manufacturing Company, the specification of which is incorporated in its entirety by reference. The '941 patent teaches a method of splicing one end of a heatable section to an end of a cold section by first exposing a substantial section of the heating element coil from the end of the sheath of the heatable section by: 1) manually cutting away a portion of the sheath and insulating filler, 2) inserting a cold pin with a tapered end into the exposed end of heating element coil, and then 3) physically joining the two ends together. Finally, an insulating filler is placed around the cold pin and the cold pin-heating element junction while the metal sleeve is placed around the insulating filler. Preferably, the ends of the respective heatable and cold sections are attached to the metal sleeve by a conventional welding procedure and then the entire assembly is swaged to a uniform diameter.

The '941 patent represents a much improved method of splicing heatable and cold sections of a tubular heater together over prior methods. However, further improvements are desirable. For instance, the splicing operation of the prior art requires manually cutting back the heater section to expose the heating element coil, then manually welding the cold pin to the heating element coil, insulating the welded section, sliding a metal tube over the insulated terminal to the sheath of the heatable section, followed by swaging the tube to complete the joint. Furthermore, the method of the '941 patent requires that numerous different parts and material be kept in stock, such as metal sleeves and insulating filler.

Therefore, there appears a need in the art for an automated method and apparatus for splicing the ends of two tubular heater sections together without additional parts or special preparation of the heatable and cold section ends.

OBJECTS AND SUMMARY OF THE INVENTION

The primary object of the present invention is to provide an apparatus for splicing together the respective ends of a cold section with a heatable section of a tubular heater without additional parts or special manual preparation of the section ends.

Another object of the present invention is to provide an automated apparatus and related method for splicing together respective ends of a cold section with a heatable section of a tubular heater.

Another further object of the present invention is to provide an apparatus for splicing one end of a cold section with a heatable section of a tubular heater by melting a portion of the cold pin and physically joining it to the end of the heatable section.

These and other objects of the present invention are realized in the preferred embodiment of the present invention, described by way of example and not by way of limitation, which provides for a method and apparatus of splicing respective ends of a cold section with a heatable section of a tubular heater.

In brief summary, the present invention overcomes and substantially alleviates the deficiencies in the prior art by providing an apparatus for splicing a heatable section of a tubular heater to a cold section thereof. The heatable section of the tubular heater generates heat energy for heat transfer systems and includes an outer sheath having an insulating filler that surrounds a center heating element coil which extends substantially the length of the outer sheath. When properly assembled, electrical current is passed through the heating element coil which causes it to generate heat. The cold section of the tubular heater provides the necessary electrical current to the heatable section and includes an outer sheath with an insulating filler that surrounds an electrically conductive cold pin which extends substantially the length of the outer sheath. A properly assembled tubular heater of the present invention joins the heatable and cold sections together in a splicing operation such that electrical current passes from the cold pin to the heating element coil for generating heat energy.

The apparatus for splicing the tubular heater according to the present invention comprises an enclosure defining a chamber. This chamber includes a platform extending from one side of the enclosure having a notched portion formed along its center and a roller assembly extending through apertures formed along the opposite side of the enclosure. The enclosure further defines first and second opposed openings in communication with the chamber. The first and second openings are respectively aligned with the notched portion and the roller assembly. The roller assembly and platform include placement and staging portions aligned with the first and second openings, respectively, which stage the heatable and cold sections thereon and facilitate the movement of these sections during the splicing operation. The enclosure further comprises at least one welding tip which extends into the chamber and is adapted to melt the exposed end of the cold pin and then circumferentially weld the abutting ends of heating element and cold pin together during the splicing operation.

In accordance with the method of the present invention, a user first places the heatable section on the notched portion of the platform and the cold section on the placement portion of the roller assembly. The heatable and cold sections are then directed into the chamber through respective first and second openings to a predetermined depth therein. After entering the chamber, the exposed end of the heatable section contacts a stop located inside the enclosure and the welding tip is placed in close proximity with the end of the cold section having the cold pin exposed. The welding tip which initiates an electrical arc by imposing a high voltage between the welding tip and the cold pin turns the exposed portion of the cold pin into a molten pool. The welding tip is then directed out of contact with the cold pin and the ends of the heatable and cold sections are brought into physical contact with one another such that the molten pool of the cold pin and the exposed end of the heating element coil form a secure welded connection as the molten pool solidifies around the coil. A second welding tip is then brought into close proximity with the ends of the outer sheaths to form a circumferential weld joint along the juncture of the ends as the heatable and cold sections are rotated about their centers by the staging portion of the roller assembly, thereby establishing a splice therebetween.

Additional objects, advantages and novel features of the invention will be set forth in the description which follows, and will become apparent to those skilled in the art upon examination of the following more detailed description and drawings in which like elements of the invention are similarly numbered throughout.

BRIEF DESCRIPTION OF THE DRAWINGS

FIG. 1 is a side view of heatable and cold sections of a tubular heater according to the present invention;

FIG. 2 is an end view of the heatable section of FIG. 1 taken along line 2—2 according to the present invention;

FIG. 3 is an end view of the cold section of FIG. 1 taken along line 3—3 according to the present invention;

FIG. 10a is an enlarged cutaway view from FIG. 10 according to the present invention;

FIG. 12 is a side view of heatable and cold sections being joined by a circumferential weld according to the present invention;

DETAILED DESCRIPTION OF THE INVENTION

Figure 4:
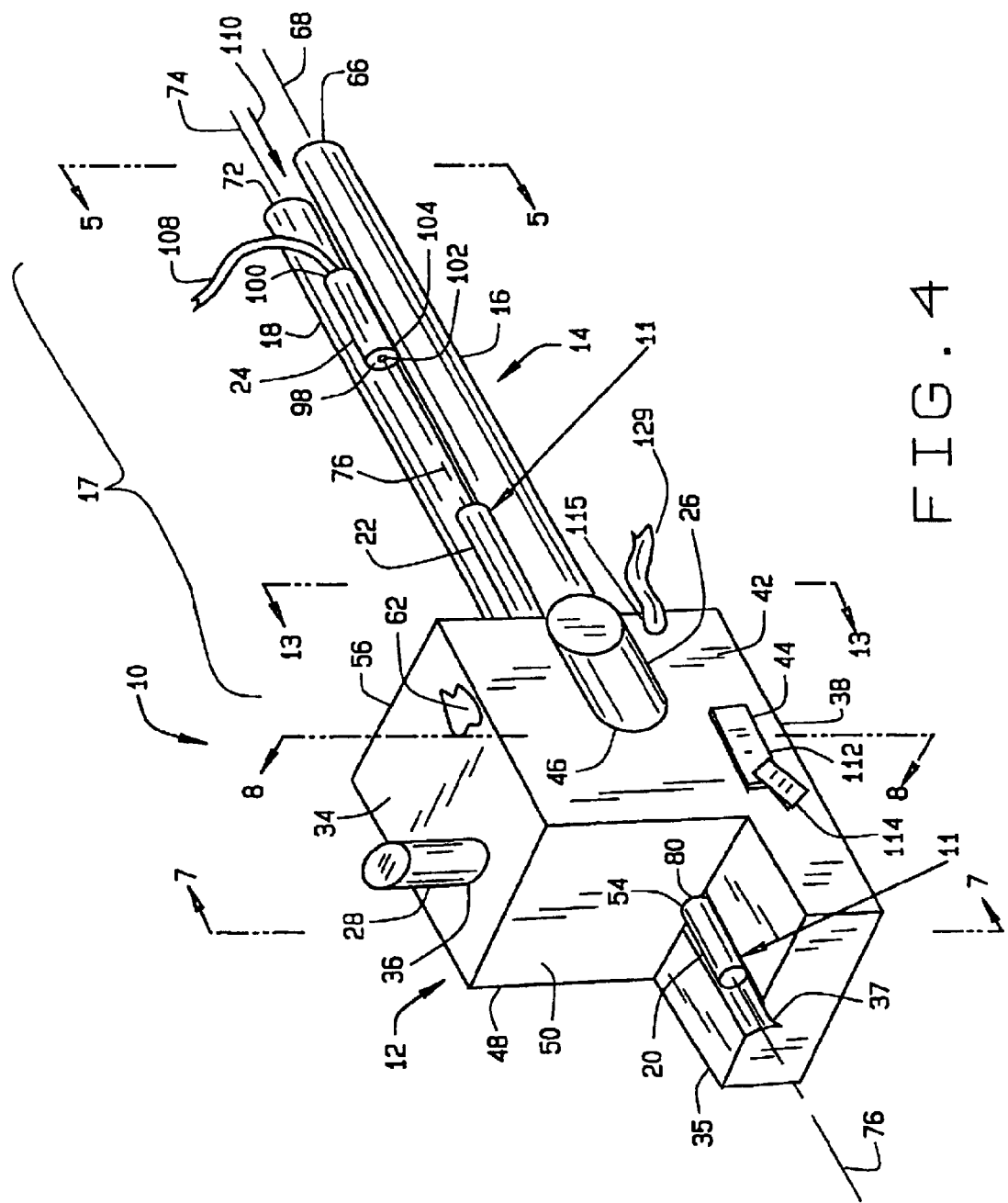
FIG. 4 is an orthogonal view of a splicing apparatus according to the present invention.
Figure 5:
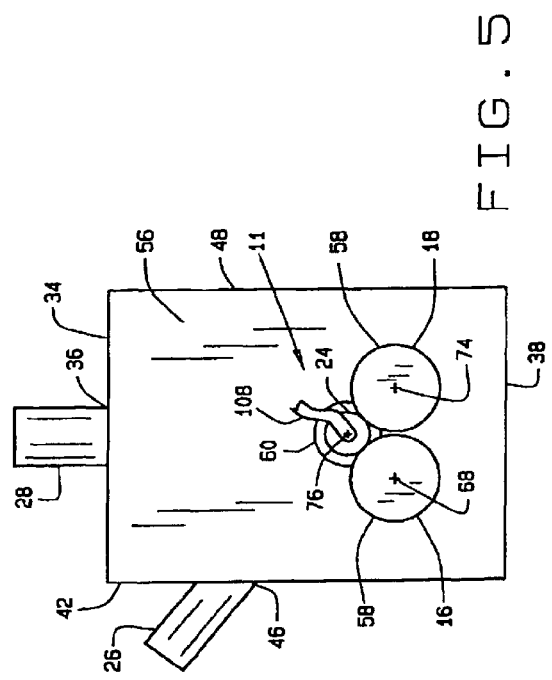
FIG. 5 is a cross-sectional view, taken along line 5—5 of FIG. 4, of the splicing apparatus according to the present invention.

Referring to the drawings, the preferred embodiment of the apparatus for splicing a tubular heater 11 according to the present invention is illustrated and generally indicated as 10 in FIG. 4.

Referring to FIGS. 1–4, tubular heater 11 is a conventional heating device for providing a source of heat comprising a heatable section 20 connected to a cold section 22. The heatable section 20 provides the means for producing heat and includes an elongated outer sheath 78 having an insulating filler material 86 surrounding a conventional heating element 84 which extends the length of section 20, while cold section 22 conducts an electrical current for powering heatable section 20 and includes a similarly shaped outer sheath 88 also having an insulating filler material 86 with a cold pin 94 connectable to a power source (not shown). The splice produced by splicing apparatus 10 provides both a welded connection between the heating element 84 and the cold pin 94 as well as a circumferential welded joint 134 (FIG. 12) along the juncture of the outer sheath ends of respective heatable and cold sections 20 and 22.

Referring specifically to FIGS. 1 and 2, outer sheath 78 of heatable section 20 may be made from a suitable temperature resistant material, including, but not limited to iron, iron alloy, metal or nonmetal. Heatable section 20 includes a splicing end 80 and an opposed end 82 with a coiled heating element 84 that extends longitudinally between ends 80, 82. Preferably, a filler material 86 made of a thermally conductive material, such as magnesium oxide, surround the heating element 84, although any suitable insulating material is felt to fall within the spirit and scope of the present invention. To prepare heatable section 20 for splicing, the splicing end 80 should be cut flush with and perpendicular to a center axis 76. Although not required, it may be desirable for the user to grasp and expose a length of the coiled heating element 84 in a direction away from heatable section 20 so that heating element 84 extends approximately $\frac{1}{16}$ of an inch outwardly from splicing end 80 as will be discussed in greater detail below.

Referring now to FIGS. 1, 3 and 4, outer sheath 88 of cold section 22 has a spliced end 90 and an opposed end 92 with cold pin 94 extending longitudinally between ends 90, 92. A power adapter 95 is connected to cold pin 94 adjacent opposed end 92 for coupling pin 94 to a source of electrical power (not shown). Filler material 86 also surrounds and secures cold pin 94 between outer sheath 88 and pin 94. Preferably, the cross-sectional profile of outer sheath 88 is substantially the same shape and size to that of outer sheath 78 of heatable section 20. It is also preferable that splicing end 90 be cut flush and perpendicular to center axis 76 prior to splicing.

Referring to FIG. 4, splicing apparatus 10 comprises an enclosure 12 for splicing together abutting ends of heatable and cold sections 20, 22 as well as a roller assembly 14 and platform 35 that provide a staging area and means for properly positioning the heatable and cold sections 20, and 22 during the two step splicing operation. Enclosure 12 is defined by upper and lower surfaces 34, 38, front and back surfaces 42, 48 and opposing side surfaces 50, 56 which collectively define an interior chamber 62. To permit safe viewing of chamber 62 and the splicing operation, an aperture 44 formed through front surface 42 is covered by a tinted viewing plate 112 which is secured by a retaining member 114. Roller assembly 14 provides a stable platform for properly aligning and carrying cold section 22 for directed movement along center axis 76 (FIGS. 4, 13) by an actuator 24 that is also carried on roller assembly 14 as shall be discussed in greater detail below.

Roller assembly 14 includes first and second rollers 16, 18 which are rotatable along respective center axes 68, 74. As shown in FIGS. 4 and 9, first and second rollers 16, 18 define respective first ends 64, 70 each extending through chamber 62 and respective second ends 66, 72. Roller assembly 14 further defines a placement portion 17 for placement of cold section 22, and a staging portion 15 for staging heatable and cold sections 20, 22 in preparation for the subsequent splicing operation. Preferably, first and second rollers 16, 18 have elongated, tubular configurations capable of rotational movement about their respective center axes 68, 74 by a conventional driving device 75 (FIGS. 7, 8).

Figure 7:
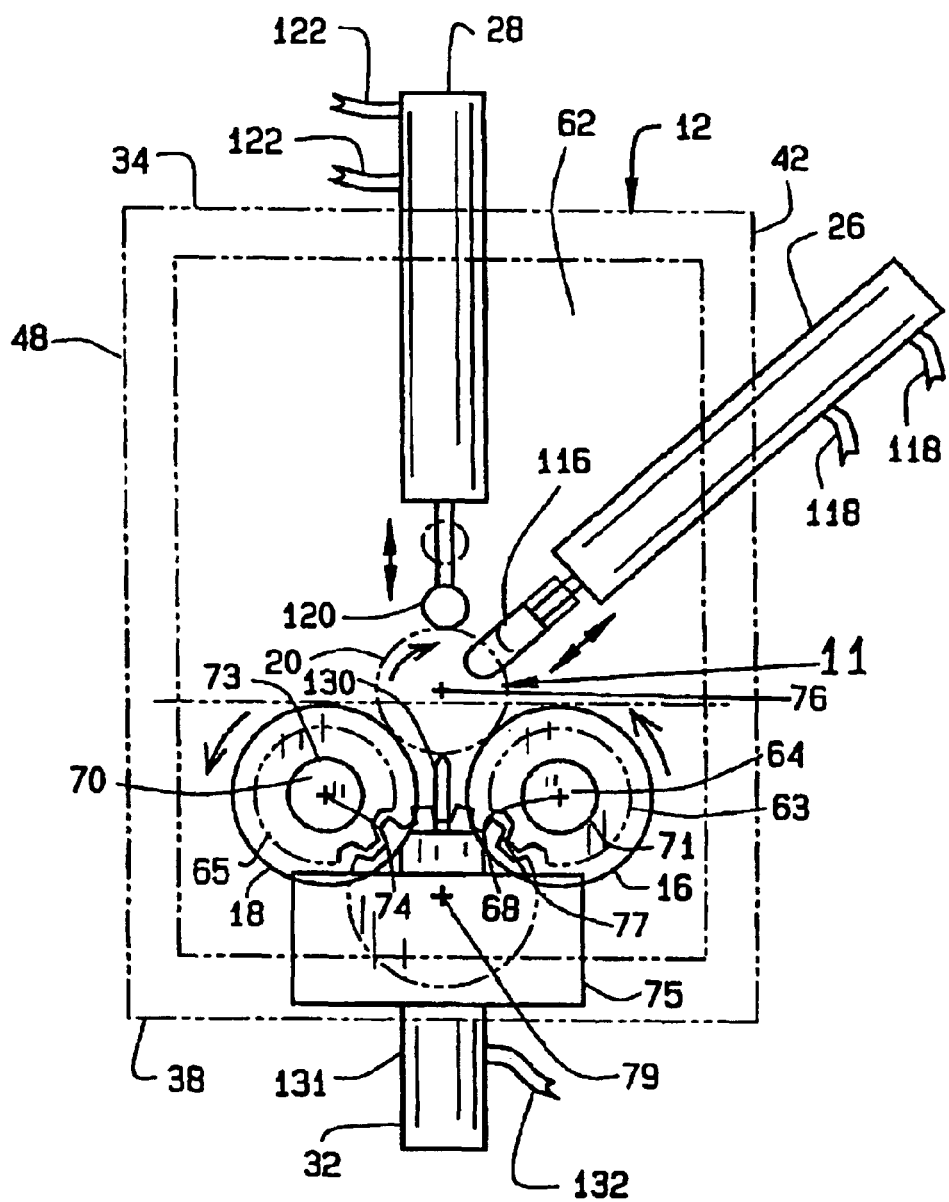
FIG. 7 is a cross-sectional view, taken along line 7—7 of FIG. 4, of the splicing apparatus according to the present invention.
Figure 8:
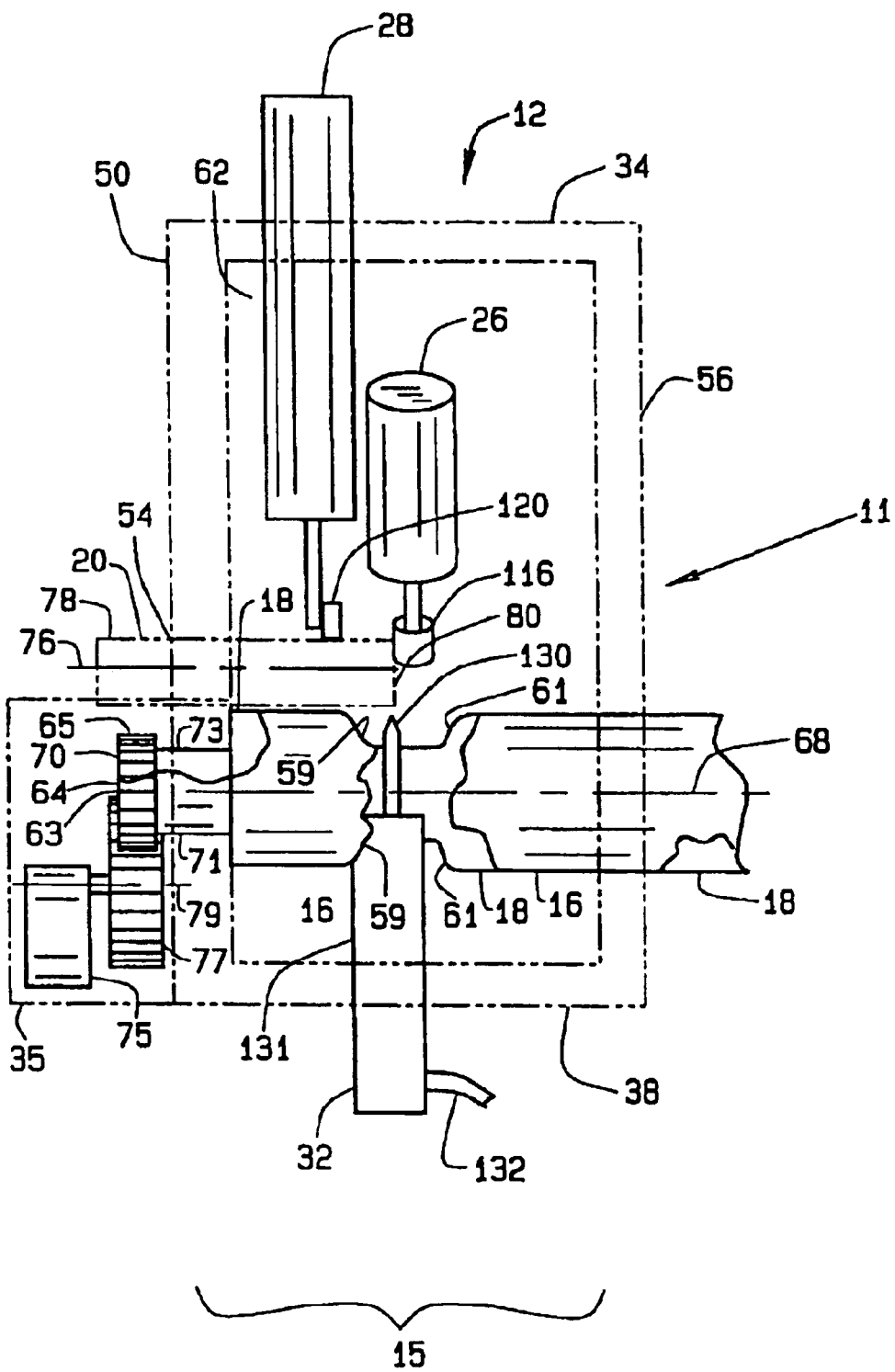
FIG. 8 is a cross-sectional view, taken along line 8—8 of FIG. 4, of the splicing apparatus according to the present invention.
Figure 9:
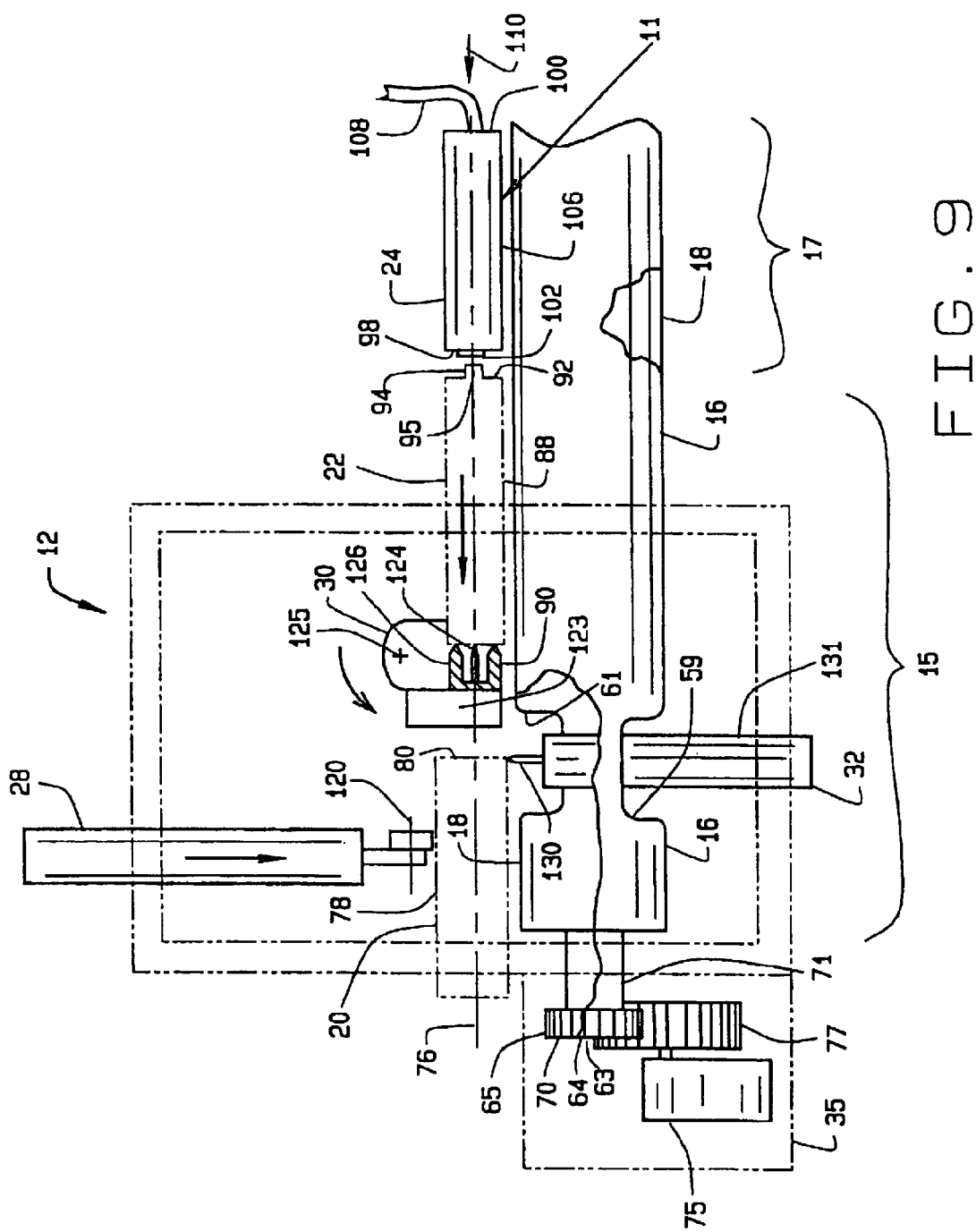
FIG. 9 is a cross-sectional view, taken along line 8—8 of FIG. 4, illustrating a sequence of the splicing operation according to the present invention.
Figure 10:
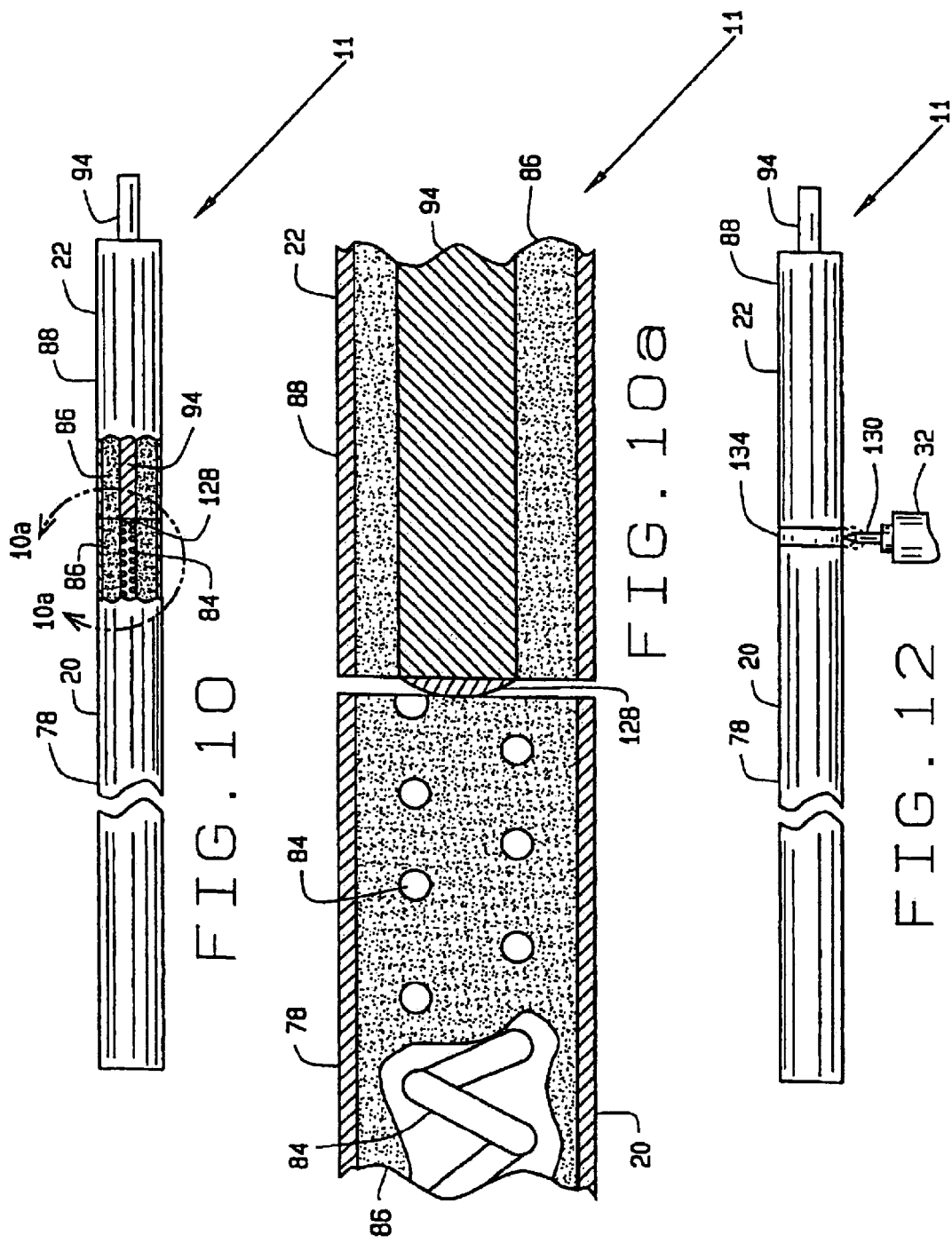
FIG. 10 is a partial cutaway side view of joined heatable and cold sections according to the present invention.

Referring to FIGS. 7 and 8, driving device 75, includes, but is not limited to a motor powered by electricity, hydraulics or pneumatics, which provides driven rotational movement to a gear 77 about center axis 79. Meshing with gear 77 to provide driven rotational movement of first and second rollers 16, 18 are gears 63, 65. Gears 63, 65 slide over and frictionally engage reduced diameter regions 71, 73. In other words, driving device 75 drives gear 77 into driven rotational movement in a direction about axis 79. Rotating gear 77 meshes with gears 63, 65, driving both first roller 16 into rotational movement about axis 68 and second roller 18 into rotational movement about axis 74, each in an opposing direction. To provide clearance for TIG welder 32 while maintaining first and second rollers 16, 18 in close proximity with each other, respective longitudinally aligned grooves 59, 61 are formed therein. This arrangement of grooves 59, 61 in rollers 16, 18 additionally permits a circumferential weld joint 134 to be formed between heatable section 20 and cold section 22 as the sections 20, 22 are rotatably carried about center axis 76 by rollers 16, 18 as shall be discussed in greater detail below.

Figure 6:
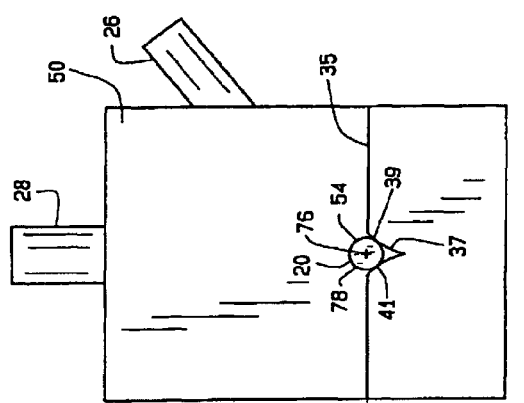
FIG. 6 is an end view of the splicing apparatus according to the present invention.

Referring to FIGS. 4 and 6–8, platform 35 extends longitudinally in a direction opposite roller assembly 14 from surface 50 of enclosure 12 and includes a longitudinal notched portion 37 formed therealong for maintaining heatable section 20 in proper alignment with center axis 76. As illustrated in FIG. 6, outer sheath 78 of heatable section 20 makes first and second tangential contacts 39, 41 with notched portion 37 so that the center of heatable section 20 is further maintained in proper alignment with center axis 76. Because the sides of notched portion 37 are radiused to match the radii of roller assembly 14, heatable sections 20 having different diameters will also be maintained in alignment with center axis 76. Also in alignment with center axis 76, opening 54 for receiving heatable section 20 therethrough communicates with chamber 62. To prevent overinsertion of heatable section 20 into chamber 62, a stop 26 of plunger 116 contacts heatable section 20 as it is directed into chamber 62. A roller actuator 28 for preventing further longitudinal movement of heatable section 20 along center axis 76 includes an actuating roller 120 that extends vertically downward into chamber 62. Actuating roller 120 establishes tangential rotatable contact with heatable section 20. Both stop 26 and roller actuator 28 utilize respective pneumatic interfaces 118 and 122 from a pneumatic source (not shown) to provide driven control of plunger 116 and roller 120.

Figure 13:
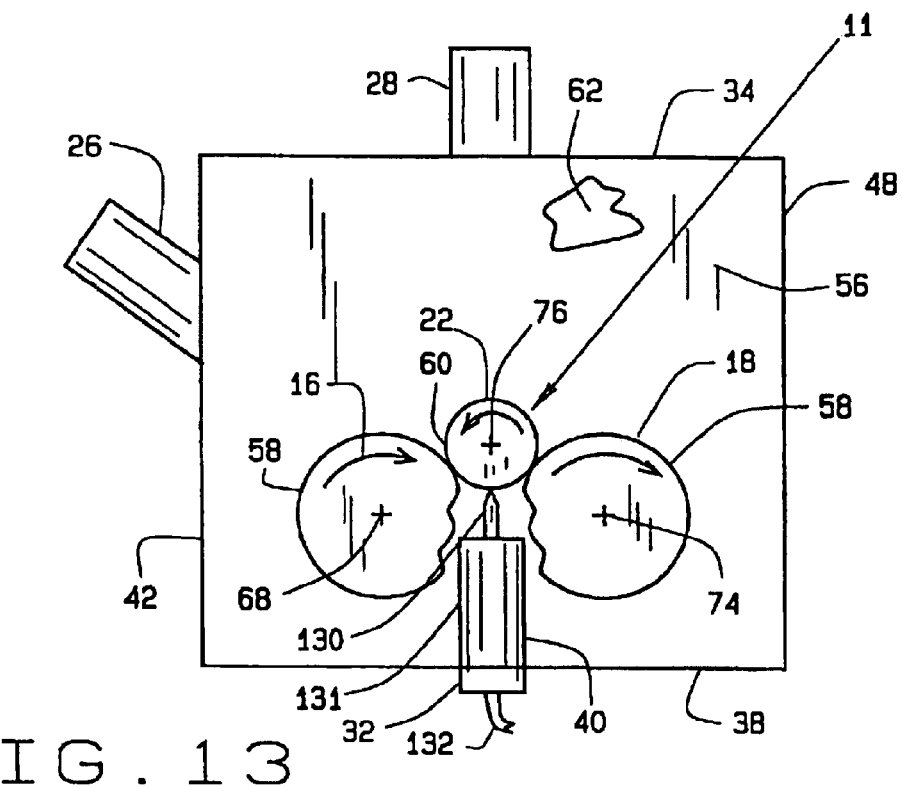
FIG. 13 is a cross-sectional view, taken along line 13—13 of FIG. 4, showing the rotation of the roller assembly according to the present invention.

Referring to FIGS. 4, 9 and 13, cold section 22 is placed between rollers 16, 18 along placement portion 17 such that splicing end 90 faces opening 60 and is in axial alignment with heatable section 20 along center axis 76. An actuator 24 for providing driven movement of cold section 22 is placed in contact with opposing end 92 of cold section 22 for driving cold section 22 along roller assembly 14 and into chamber 62 until splicing end 90 contacts a rotatable TIG welder 30. As illustrated in FIG. 9, splicing end 90 contacts an annular insulating spacer 126 preferably composed of a ceramic or other refractory material which surrounds a welding tip 124 of TIG welder 30 such that a proper spacing is maintained between splicing end 90 and welding tip 124. In this position, welding tip 124 is also in substantial alignment with center axis 76. Because heating element 84 and cold pin 94 are each centered within sections 20 and 22, respectively, both are also substantially aligned with one another along center axis 76.

Referring to both FIGS. 4 and 9, actuator 24 comprises a cylindrical housing 106 having a contacting end 98 and a far end 100 which simultaneously applies a directing force 110 to cold section 22, while also transmitting an electrical current to section 22. The actuator 24 further comprises an electrically conductive element 102 that extends longitudinally through housing 106 and is adapted for connection with an electrical power interface 108 at far end 100. When actuator 24 contacts cold section 22, an electrical current is conducted from an electrical power source (not shown) through conductive element 102 to cold section 22. Conductive element 102 is centered within housing 106 by an insulating material 104 that surrounds element 102. In its position between rollers 16, 18 along placement portion 17 of roller assembly 14, conductive element 102 is maintained in substantial alignment with center axis 76. As illustrated in FIG. 4, a driving arrangement (not shown), such as a pneumatic or hydraulic source, generates a driving force 110 for driving actuator 24 longitudinally along center axis 76. Thus, after the user places cold section 22 on placement portion 17 between enclosure 12 and actuator 24, actuator 24 contacts and drives cold section 22 along center axis 76 toward enclosure 12 during the splicing operation.

Figure 11:
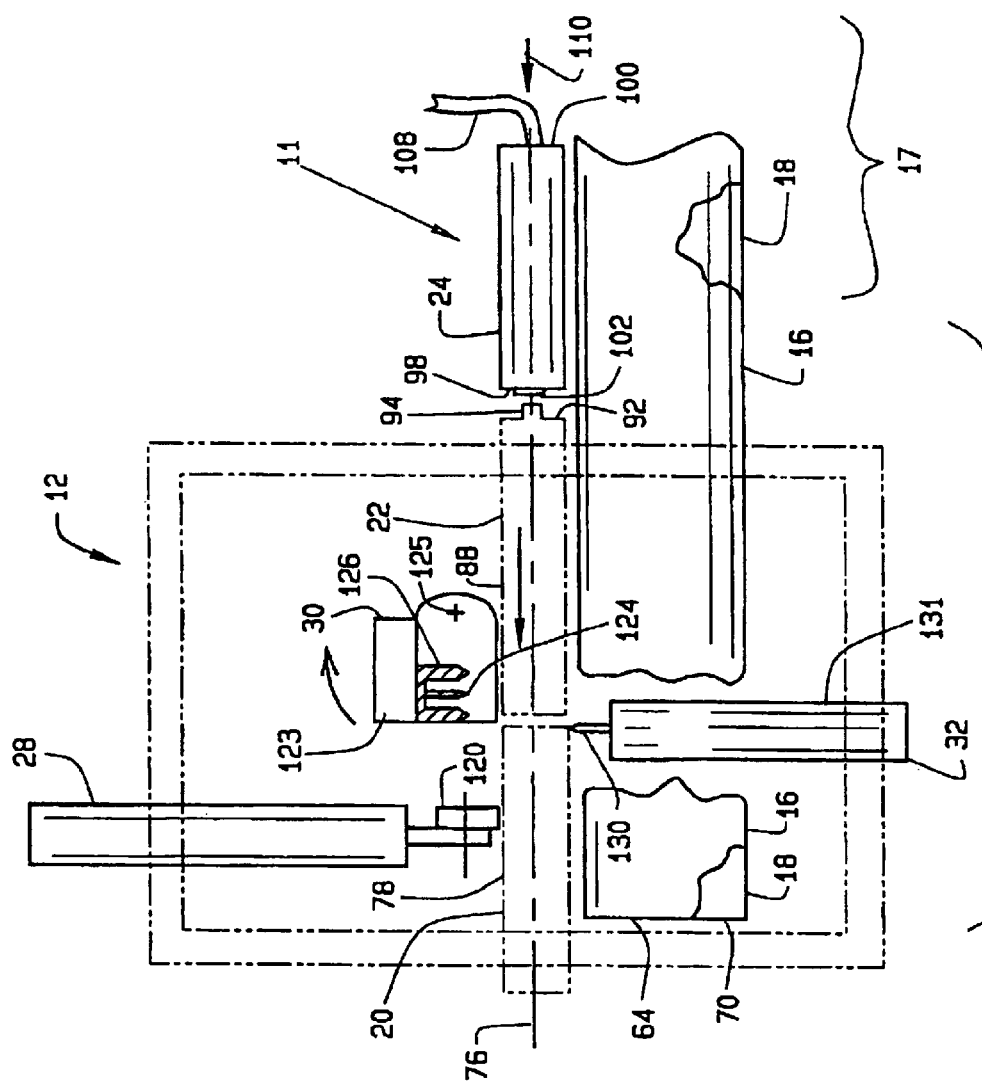
FIG. 11 illustrates another sequence in the splicing operation according to the present invention.

Referring to FIGS. 9 and 11, TIG welder 30 is preferably a Tungsten Inert Shielded Gas (TIG) welding device for melting the exposed end of cold pin 94 during the splicing operation. TIG welder 30 comprises a rotatable arm 123 with a welding tip 124 formed at the free end thereof. Welding tip 124 is a conventional tungsten electrode which provides a means for producing a weld connection between the exposed ends of heating element 84 and cold pin 94. As shown, annular spacer 126 surrounds welding tip 130 and ensures proper spacing between welding tip 130 and splicing end 90 of cold section 22. Rotating arm 123 is rotatable about pivot axis 125 to rotate welding tip 124 both into and out of alignment with center axis 76. When welding tip 124 is aligned with center axis 76, spacer 126 acts as a stop for splicing end 90 of cold section 22 which has been directed along center axis 76 by actuator 24, as noted above. An inert gas source (not shown) delivers inert gas to chamber 62 for improving the weld quality via an inert gas interface 129 which passes through an opening 115 in front surface 42.

Referring to FIGS. 9, 11–13, TIG welder 32 is also a TIG welding device for providing a circumferential weld joint 134 between splicing end 80 of heatable section 20 and splicing end 90 of cold section 22. TIG welder 32 comprises an arm 131 having a welding tip 130 which extends through an opening 40 in lower surface 38 of body 12 and communicates with chamber 62. To accommodate different diameters of sections 20, 22, TIG welder 32 may be vertically adjustable. Welding tip 130 receives an electrical current conducted along an electrical interface 132 that is provided by an electrical power source (not shown) for initiating an electrical welding arc. During the staging operation of heatable section 20, splicing end 80 is positioned in radial alignment with welding tip 130 such that tip 130 is positioned adjacent outer sheath 78. This radial alignment between splicing end 80 and welding tip 130 is maintained by roller 120 of roller actuator 28. Roller 120 permits rotation of heatable section 20 about center axis 76 by roller assembly 14 driven by driving device 75 without permitting longitudinal translation along center axis 76 which maintains the axial alignment necessary for establishing a circumferential weld joint 134 along juncture 136 as will be described in greater detail below.

Referring to FIGS. 4–13, the operation of splicing machine 10 shall now be discussed. Cold section 22 is set on and is rotably carried by the placement portion 17 of roller assembly 14 such that splicing end 90 faces opening 60, and outer sheath 88 rests in tangential contact with first roller 16 and second roller 18 so that cold pin 94 is substantially aligned with center axis 76. The user directs section 22 along center axis 76 in a direction toward body 12 until splicing end 90 enters chamber 62 and contacts spacer 126 of TIG welder 30. The actuator 24 is then slid along center axis 76 in a direction toward cold section 22 until conductive element 102 is positioned adjacent second end 92. Next, the user places heatable section 20 in notched portion 37 of platform 35 and directs heatable section 20 toward opening 54 along center axis 76 until splicing end 80 enters chamber 62 and outer sheath 78 comes into contact with plunger 116 of stop 26. Upon contacting plunger 116, at least a portion of heatable section 20 is rotatably carried about center axis 76 by staging portion 15 for staging heatable section 20 in preparation for the subsequent splicing operation between heatable section 20 and cold section 22.

Preferably, the contact between plunger 116 and splicing end 80 establishes an electrical circuit (not shown) which causes roller 120 to extend downwardly from roller actuator 28 and into tangential contact with outer sheath 78, thereby further preventing longitudinal movement of heatable section 20 along center axis 76 while still permitting rotational movement thereabout. The driving source applies a driving force 110 along center axis 76 to actuator 24, thereby causing conductive element 102 to contact power adapter 95 of cold pin 94. This action forces cold section 22 along center axis 76 in a direction toward chamber 62 of body 12. Actuator 24 directs cold section 22 into chamber 62 so that splicing end 90 passes from placement portion 17 into staging portion 15 until splicing end 90 contacts spacer 126 of TIG welder 30. This contact brings welding tip 124 into close proximity with cold pin 94 at splicing end 90. Once the staging procedure for heatable and cold sections 20, 22 has been completed, inert gas source (not shown) delivers inert gas to chamber 62 via inert gas interface 129. The electrical power source then supplies electrical current which is transmitted along interface 108 of actuator 24 through contacting end 98 of conductive element 102. Once the electric current is transmitted through cold pin 94 to welding tip 124, an electrical circuit is completed which then transmits an electrical current through the electrical interface of TIG welder 30 to impose a high voltage between welding tip 126 and cold pin 94. Once an arc is established between welding tip 126 and cold pin 94 due to the voltage therebetween, the exposed portion of the cold pin 94 located along splicing end 90 melts, thereby forming a molten pool 128 thereon.

Once molten pool 128 is formed, TIG welder 30 rotates about pivot axis 125 until sufficient clearance is provided to permit cold section 22 to further proceed longitudinally along center axis 76 past TIG welder 30. Pneumatic interface 122 then moves plunger 116 out of the path of cold section 22. Once TIG welder 30 has rotated out of the way, driving force 110 is reapplied against actuator 24 to direct cold section 22 along center axis 76 until splicing end 90 is brought into contact with splicing end 80 of heatable section 20. Because heatable section 20 and cold section 22 share a common center axis 76 along roller assembly 14, molten pool 128 and heating element 84 are brought into direct contact with each other forming a weld connection therebetween as molten pool 128 solidifies around heating element 84.

While this weld connection is still being formed, first roller 16 and second roller 18 of roller assembly 14 are driven to rotate in the same rotational direction about respective axes 68, 74 due to gear 77 of driving device 75 meshing with gears 63, 65 of first and second rollers 16, 18. Heatable section 20 and cold section 22 are rotatably carried by roller assembly 14 so that this rotational movement imparts an opposing rotational movement about center axis 76 to heatable section 20 and cold section 22 which rotate in unison. Electrical power is then applied to welding tip 130 of TIG welder 32 that is longitudinally aligned with grooves 59, 61 formed in first and second rollers 16, 18. TIG welder 32 imposes a high voltage between welding tip 130 and outer sheaths 78, 88 of sections 20, 22 that initiates a welding arc. As heatable and cold sections 20, 22 rotate about center axis 76, the welding arc initiated between welding tip 130 and sections 20, 22 forms a circumferential weld joint 134 along juncture 136 between outer sheaths 78, 88 of respective splicing ends 80, 90. Grooves 59, 61 provide clearance between circumferential weld joint 134 that is being formed and first and second rollers 16, 18. Once a complete circumferential weld joint 134 has been established, roller 120 is retracted and the driving force 110 removed from actuator 24. The splicing operation has now been completed and the newly spliced heatable and cold sections 20, 22 may be removed by directing opposing end 82 of heatable section 20 along center axis 76 in a direction away from chamber 62 until opposing end 92 of cold section 22 has fully passed through opening 54. Upon removal of the spliced sections 20, 22, the operation may be repeated.

It should be apparent to one of ordinary skill in the art that it would be possible to utilize any welding method to establish the weld connection and circumferential weld joint. Additionally, either a single TIG welder or multiple TIG welders may be used. Moreover, it should be apparent that any number of driving or actuating methods in addition to pneumatics, such as hydraulics, electrical, or mechanical devices are felt to fall within the scope of the present invention.

Figure 14:
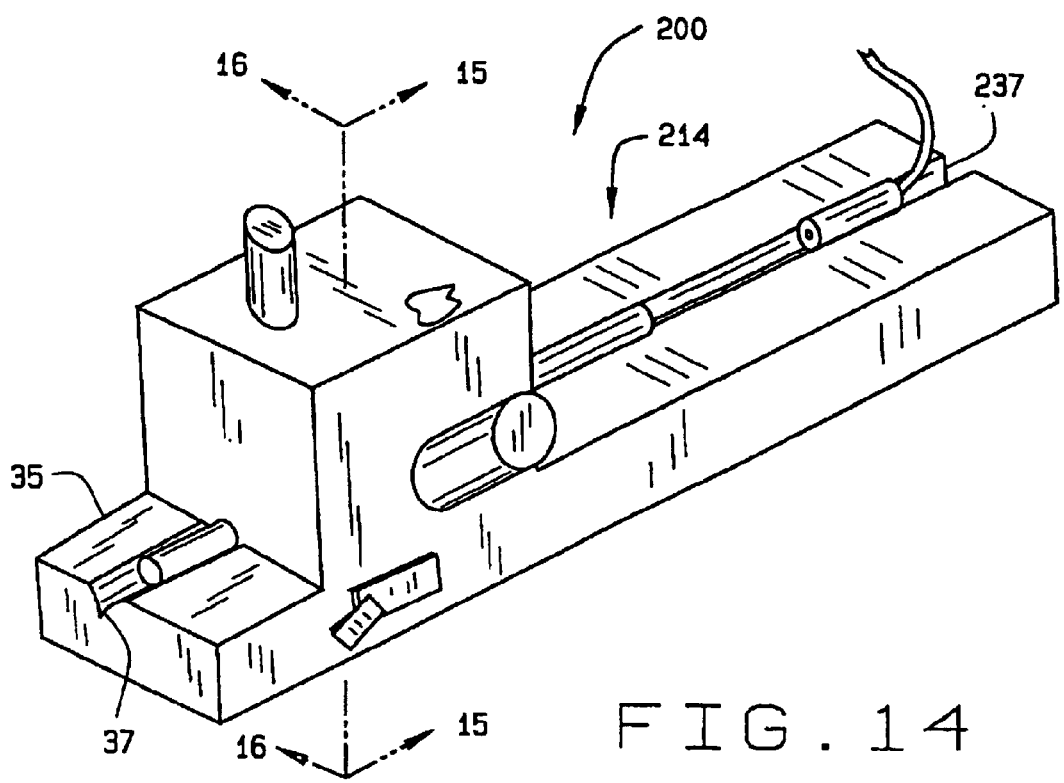
FIG. 14 is an orthogonal view of an alternate embodiment of the splicing apparatus according to the present invention.

Referring to FIG. 14, an alternate embodiment of the present invention designated as 200 shall now be discussed. For clarity, all components remain the same as with the preferred embodiment 10 unless noted otherwise. A significant difference between alternate embodiment 200 and preferred embodiment 10 is the absence of roller assembly 14.

In place of roller assembly 14, alternate embodiment 200 comprises a platform 214 that is axially aligned with platform 35 and includes a notched portion 237 which is substantially identical to notched portion 37 so that heatable section 20 and cold section 22 can be maintained in axial alignment.

Figure 15:
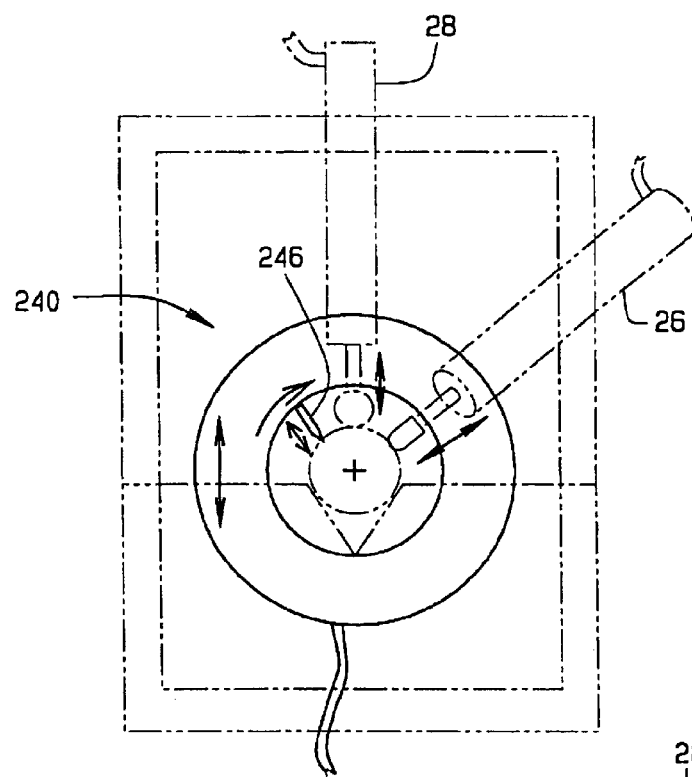
FIG. 15 is a cross-sectional view, taken along line 15—15 of FIG. 14, of an alternate embodiment of the splicing apparatus according to the present invention.
Figure 16:
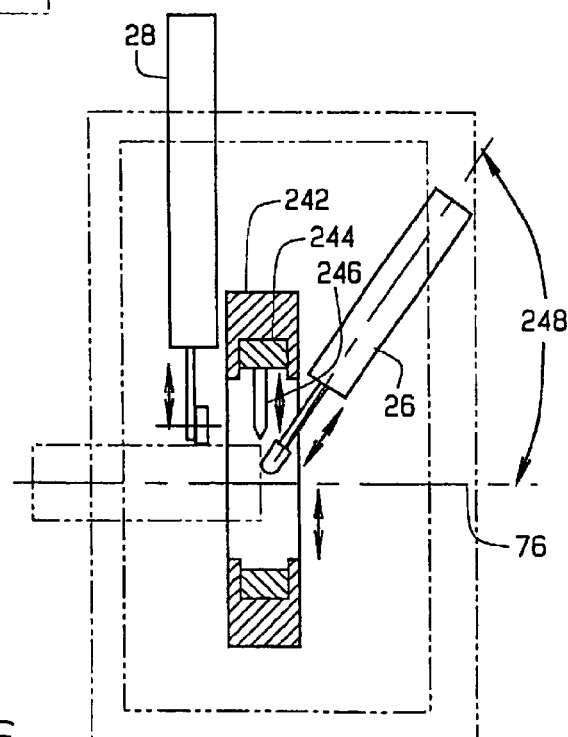
FIG. 16 is a cross-sectional view, taken along line 16—16 of FIG. 14, of an alternate embodiment of the splicing apparatus according to the present invention.

Referring to FIGS. 15–16, a further difference between alternate embodiment 200 and preferred embodiment 10 is the substitution of an orbital welding device 240 for welding device 32. Orbital welding device 240 includes an annular rotor 244 that secures a welding tip 246 therein for forming a circumferential weld along the junction of heatable and cold sections 20, 22. Preferably, welding device 240 is a TIG welder. The circumferential weld, as previously discussed, is formed after heatable and cold sections 20, 22 are brought into physical contact once the molten pool 128 has been formed along splicing end 90. Rotor 244 is rotatably carried by a weld head 242. To account for different diameters of heatable and cold sections 20, 22, welding device 240 may incorporate a centering device (not shown) to maintain device 240 in a centered position relative to the center axis 76 of sections 20, 22. Device 240 may further direct welding tip 246 along its longitudinal axis as tip 246 rotates within weld head 242 so that device 240 may account for different diameters of heatable and cold sections 20, 22 absent the centering device. Alternatively, a unique welding device 240 configuration sized for each diameter of sections 20, 22 may be used.

Although heatable and cold sections 20, 22 are not driven in rotational movement in alternate embodiment 200 in order to effect the formation of the circumferential weld, portions 20, 22 are secured in axial alignment by roller actuator 28 in the same manner as in the preferred embodiment 10. Similarly, stop 26 also operates to control the axial position of heatable section 20, although due to the position of welding device 240, stop 26, as disclosed in preferred embodiment 10, must be positioned at an oblique angle 248 relative to center axis 76 in order to provide sufficient clearance therewith.

In addition, the present invention contemplates that the sequence of operations may vary, depending upon whether the splicing operation is automated or not. In an automated operation, cold section 22 is preferably installed first on the roller assembly 14 as noted above. Upon the splicing end 80 of heatable section 20 contacting plunger 116, an electrical circuit is completed which initiates the splicing operation by the splicing apparatus 10. However, in manual operation, the order of staging the heatable and cold sections 20, 22 is not critical, so long as cold section 22 has been staged and heatable section 20 brought into contact with plunger 116 inside chamber 62. It should be further appreciated that the timing for the introduction of inert gas to enclosure 12 is not critical, so long as the inert gas is present within enclosure 12 to facilitate welding.

While the preferred embodiment of the roller assembly 14 extends only from one side of enclosure 12, it is also felt that the roller assembly can extend from both sides of enclosure 12, thereby effectively replacing platform 35.

Also, while the preferred embodiment shows the heatable section 20 entering the chamber 62 along the platform 35, and the cold section entering the chamber 62 along the roller assembly 14, it is apparent that this arrangement could be reversed.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

I claim:

1. An system for splicing a tubular heater comprising:
   a tubular heater including a heatable section and a cold section, said heatable section having opposing end including an outer sheath and a heating element, said heating element being inside said outer sheath, and said cold section having opposing ends including an outer sheath and a cold pin,
   a splicing apparatus including an enclosure defining a chamber, said enclosure further defining opposed openings in communication with said chamber,
   at least one welding tip extending into said chamber and capable of melting said cold pin and welding the ends of said heatable and cold sections together,
   wherein one end of said heatable section and one end of said cold section are each directed into one of respective said opposed openings to a predetermined depth, said at least one welding tip being placed in close proximity with said cold pin of said end of said cold section forming a molten pool thereon, said ends of said heatable and cold sections being brought into contact wherein said molten pool and said heating element form a connection therebetween as said molten pool solidifies.

2. The system according to claim 1 wherein said heatable and cold sections are circular in cross section.

3. The system according to claim 1 wherein said welding tip is a Tungsten Inert Shielded Gas welder.

4. The system according to claim 1 wherein said chamber is filled with an inert gas.

5. The system according to claim 1 wherein said heating element and said cold pin are substantially centered within respective outer sheaths by a filler material.

6. The system according to claim 5 wherein said filler material is magnesium oxide.

7. The system according to claim 1 further comprising a pair of rollers in communication with said chamber and aligned with said opposed openings.

8. The system according to claim 7 wherein a platform extends from said enclosure in alignment with said pair of rollers.

9. The system according to claim 8 wherein said platform includes a groove formed therein for alignment with said opposed openings.

10. The system according to claim 7 further comprising an actuator resting on said pair of rollers for directing said cold section therealong.

11. The system according to claim 1 wherein said at least one welding tip is capable of forming a weld joint along a juncture of said ends of said heatable and cold sections, thereby establishing a splice therebetween.

12. The system according to claim 1 wherein said at least one welding tip comprises a Tungsten Inert Shielded Gas welder.

13. The system according to claim 1 wherein said at least one welding tip comprises an orbital Tungsten Inert Shielded Gas welder.

14. A method of splicing a tubular heater comprising a heatable section and a cold section, said heatable and said cold sections each having an outer sheath with respective first and second ends, said heatable section having a heating element for generating heat and said cold section having a cold pin for conducting an electrical current using a splicing apparatus comprising an enclosure defining a chamber, said enclosure further defining opposed openings in communication with said chamber, at least one welding tip extending into said chamber, said at least one welding tip being capable of melting said cold pin and then welding said first ends of said heatable and cold sections together, comprising the steps of:

a) directing said first ends of said heatable and cold sections toward each other through respective said opposed openings to a predetermined depth;

b) placing said at least one welding tip in close proximity with said cold pin;

c) melting a portion of said cold pin along said first end of said cold section with said at least one welding tip;

d) pressing said first ends of said heatable section and said cold section together forming a juncture therebetween; and e) welding along said juncture of said outer sheaths with said at least one welding tip to form a weld joint therebetween.

15. The method of claim 14 wherein said step c) is performed using a Tungsten Inert Shielded Gas welder.

16. The method of claim 14 wherein said step e) is performed using a Tungsten Inert Shielded Gas welder.

17. The method of claim 14 wherein said steps c) and e) are performed in the presence of an inert gas.

18. The method of claim 14 wherein said heating element is centrally coiled along the length of said heatable section.

19. The method of claim 14 wherein said step e) is performed using an orbital Tungsten Inert Shielded Gas welder.

20. The method of claim 18 wherein a portion of said heating element is caused to extend outwardly from said first end.

21. The method of claim 14 wherein said step d) juncture is formed so that said heating element and said melted portion of said cold pin contact each other thereby forming a connection between said heating element and said cold pin as said cold pin solidifies.

22. A system for splicing a tubular heater comprising:

a tubular heater a heatable section and a cold section, said heatable section having opposing ends including an outer sheath and a heating element, said cold section having opposing ends including an outer sheath and a cold pin, a splicing apparatus including an enclosure defining a chamber, said enclosure further defining opposed openings in communication with said chamber for receiving said heatable section in one of said opposed openings and said cold section in the other said opening;

a roller assembly having first and second rollers, said roller assembly further including a staging portion in communication with said enclosure and a placement portion extending from said staging portion, said first and second rollers being aligned with said opposed openings, a platform extending from said enclosure, said platform having a groove formed therein which is aligned with said first and second rollers for carrying said heatable section therealong;

an actuator resting between said first and second rollers along said placement portion for directing said cold section therealong, and at least one welding tip extending into said chamber and capable of melting said cold pin and connecting the ends of said heatable and cold sections together, wherein upon respective ends of said heatable and cold sections being placed in each of said opposed openings, said actuator directing said cold section so that said at least one welding tip may be placed in close proximity with said cold pin for forming a molten pool thereon, said ends of said heatable and cold sections then being brought into contact with one another such that said molten pool and said heating element form a connection therebetween as said molten pool solidifies.

23. The system according to claim 22, wherein said first and second rollers are forced in rotational movement so that said heatable and cold sections rotate in unison in an opposing rotational movement along said staging portion.

24. The system according to claim 22, wherein said at least one welding tip may form a weld joint along the juncture of said ends of said heatable and cold sections, thereby establishing a splice therebetween.

25. The system according to claim 22 wherein the roller assembly extends through said enclosure.

26. The system according to claim 22 wherein said actuator drives said cold section into one of said opposed openings to a predetermined depth so that said cold section is rotatably carried by said staging portion.

27. The system according to claim 26 wherein said actuator directs the ends of said heatable and cold sections into contact with each other after said at least one welding tip contacts said cold pin for forming said molten pool thereon.

28. A system for splicing a tubular heater comprising:

a tubular heater including a heatable section and a cold section, said heatable section including an outer sheath having a heating element therein substantially extending the length of said outer sheath, said cold section including an outer sheath having a cold pin therein substantially extending the length of said sheath, a splicing apparatus including an enclosure defining a chamber, said enclosure further defining opposed openings in communication with said chamber for receiving one of said heatable section in one of said opposed opening and one of said cold section in the other of said opped opening, a platform having a notch formed therein extending from said enclosure, first and second rollers having a staging portion in communication with said enclosure and a placement portion extending therefrom in an opposing direction from said platform, said first and second rollers and said notch being aligned with said opposed openings, an actuator positioned along said placement portion, and a rotatable welding tip and a fixed welding tip extending into said chamber, said rotatable welding tip capable of melting said cold pin, said fixed welding tip capable of welding the ends of said heatable and cold sections together.

29. The system according to claim 28 wherein once said heatable section reaches said predetermined depth, said actuator includes a roller which extends downwardly into rotatable tangential contact with said heatable section thereby constraining said heatable section to rotational movement along said staging portion.

30. The system according to claim 28 wherein upon respective ends of said heatable and cold sections being placed in each of said opposed openings, said actuator capable of directing said cold section into contact with said rotatable welding tip for forming a molten pool thereon and with said fixed welding tip such that after said molten pool is formed, said actuator directs said heatable and cold sections into contact for said fixed welding tip to weld the ends of said heatable and cold sections together.

31. The system according to claim 28 wherein said first and second rollers are placed in driven rotational movement so that heatable and cold sections rotate in unison in an opposing rotational movement along said staging portion so that said fixed welding tip forms a weld joint along the juncture of said ends of said heatable and cold sections.

* * * * *

UNITED STATES PATENT AND TRADEMARK OFFICE
CERTIFICATE OF CORRECTION

PATENT NO.     : 6,806,442 B2
DATED          : October 19, 2004
INVENTOR(S)    : George B. Desloge It is certified that error appears in the above-identified patent and that said Letters Patent is hereby corrected as shown below:

Column 10,
Line 7, replace "An" with -- A --.
Line 9, replace "end" with -- ends --.

Column 11,
Line 42, insert -- including -- between "a tubular heater" and "a heatable section".

Column 12,
Line 42, replace "opped" with -- opposed --.

Signed and Sealed this

Seventh Day of February, 2006

JON W. DUDAS
*Director of the United States Patent and Trademark Office*